United States Patent
Ben-Zvi et al.

(10) Patent No.: US 8,191,776 B2
(45) Date of Patent: Jun. 5, 2012

(54) SYSTEM AND METHOD FOR FUNDING VIA A PREPAID CARD A FINANCIAL PRODUCT INTENDED OR TARGETED BY THE PURCHASER AT THE TIME OF PURCHASE

(76) Inventors: Yaron Ben-Zvi, Brooklyn, NY (US); Rimmy Malhotra, Huntington, NY (US)

( * ) Notice: Subject to any disclaimer, the term of this patent is extended or adjusted under 35 U.S.C. 154(b) by 261 days.

(21) Appl. No.: 12/586,701

(22) Filed: Sep. 26, 2009

(65) Prior Publication Data

US 2010/0078476 A1   Apr. 1, 2010

Related U.S. Application Data

(60) Provisional application No. 61/194,580, filed on Sep. 28, 2008.

(51) Int. Cl.
*G06K 5/00* (2006.01)
(52) U.S. Cl. .......................................... 235/380; 705/35
(58) Field of Classification Search .................. 235/380; 705/14, 35
See application file for complete search history.

(56) References Cited

U.S. PATENT DOCUMENTS 6,243,688 B1 * 6/2001 Kalina ...................... 705/14.18
2006/0206402 A1 * 9/2006 Sullivan ......................... 705/35

OTHER PUBLICATIONS

Website "www.upromise.com" (Sep. 10, 2009)(5 pages).

* cited by examiner

*Primary Examiner* — Kristy A Haupt
(74) *Attorney, Agent, or Firm* — DuBois, Bryant & Campbell, LLP; William D. Wiese

(57) ABSTRACT

System and method for funding via a prepaid card a financial product intended at a time of purchase by a purchaser for a customer. A customer cash account is created and funds allocated to the prepaid card are redeemed solely as cash funds in the customer's cash account. The customer may either withdraw at least some of the cash funds in the customer's cash account or apply at least some of the cash funds in the customer's cash account to a financial product. In response to receiving the customer's instructions to apply at least some of the cash funds from the customer's cash account to a financial product selected by the customer as well as their acknowledgement of disclosures or consent to an agreement related to the selected financial product, the cash funds are applied to an associated financial product account.

24 Claims, 2 Drawing Sheets

SYSTEM AND METHOD FOR FUNDING VIA A PREPAID CARD A FINANCIAL PRODUCT INTENDED OR TARGETED BY THE PURCHASER AT THE TIME OF PURCHASE

CROSS-REFERENCE TO RELATED APPLICATIONS

This application claims the benefit of U.S. Provisional Application No. 61/194,580, filed Sep. 28, 2008, which is herein incorporated by reference in its entirety.

BACKGROUND OF THE INVENTION

1. Field of the Invention

The present invention, relates to a system and method for funding via a prepaid card (e.g., a stored value card or gift card) financial products including federal and state regulated securities (e.g., stocks, bonds, mutual funds or any other instrument classified as a "security" as defined by Section 3(a)(10) of the Securities Exchange Act of 1934, as amended) and insurance intended or targeted by a purchaser at the time of purchase by non-regulated entities (e.g., entities not required to be registered or licensed as would a broker or agent in a conventional financial institution).

2. Description of Related Art

The total prepaid market in the United States in 2008 reached $247.7 billion, comprising both "open loop" and "closed loop" cards. A closed loop prepaid card is one in which the funds placed on the card is limited to use at a specified retailer(s) or with a specific sponsor of the card. So, for example, if a consumer buys a Target gift card, the funds on that card can only be used at Target stores. Gift cards are typical examples of closed loop cards.

Open loop prepaid cards may be used for multiple purposes and are equivalent to cash in that they generally have the ability to provide monetary consideration for purchases through debit or credit means using existing payment networks such as interbank networks. Pre-Paid Cards that authenticate on the Visa™ and American Express™ would be examples of open loop pre-paid cards. Open-Loop cards have broad acceptance at both retailers and Automated Teller Machines (ATMs). The intended or target product at the time of purchase by the purchaser is a cash equivalent.

As the pre-paid card market grows, these cards are being used for pre-payment of a wider array of products and services, from coffee to retail to books to electricity and restaurants. As a result, prepaid cards are now popular gifts that are given for various life occasions, for example, holidays, birthdays, weddings and other special days or events.

It would be advantageous to expand the use of prepaid cards to the funding of financial products including regulated insurance (e.g., life insurance, health insurance, home insurance, disability insurance, variable annuity) and federal or state regulated securities as defined by Section 3(a)(10) of the Securities Exchange Act of 1934, as amended. The term "security" is defined under the Act to mean " . . . any note, stock, treasury stock, security future, bond, debenture, certificate of interest or participation in any profit-sharing agreement or in any oil, gas, or other mineral royalty or lease, any collateral-trust certificate, preorganization certificate or subscription, transferable share, investment contract, voting-trust certificate, certificate of deposit for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a 'security'; or any certificate of interest or participation in, temporary or interim certificate for, receipt for, or warrant or right to subscribe to or purchase, any of the foregoing; but shall not include currency or any note, draft, bill of exchange, or banker's acceptance which has a maturity at the time of issuance of not exceeding nine months, exclusive of days of grace, or any renewal thereof the maturity of which is likewise limited." Pursuant to the Securities Exchange Act of 1933, no security may be offered or sold to the public unless the broker, sponsor, issuer or sales agent complies with all regulations under the Act.

Heretofore, open loop gift cards have been offered wherein the intended or targeted product of the card bought by the purchaser at the time of purchase is a cash equivalent to be applied by the customer or user, as desired. Since the intended or targeted product at the time of purchase by the purchaser is a cash equivalent the funds may thereafter be used, for example, for the purchase of clothes, food or any other desired product. One such permitted use by the customer is to deposit the cash allocated to such prepaid cards into a savings account subsequent to initial purchase of the card. In so doing, the customer links the prepaid debit card to a savings account established online and the funds may be transferred back and forth between the pre-paid card and the savings account subject to applicable banking regulations. The product in such cases is intended or targeted by the purchaser at the time of purchase as a cash equivalent and therefore the deposit of such cash equivalent funds by the customer into a savings account is no different than that of any other deposit of monetary funds into the savings account.

Another program is that of the UPromise™, Inc. (www.U-Promise.com) rewards program, which represents itself as a "one-stop college service provider." This program enables individuals to link pre-existing credit cards, debit cards, and loyalty cards to an established UPromise account. Regular use of these pre-existing cards then generates cash that may then be used for funding tax-advantaged 529 plans that encourage savings and investment in higher education expenses for a designated beneficiary. (See Internal Revenue Code, 26 U.S.C. §529) Through the UPromise™ service, individuals may open 529 accounts ("UPromise™ 529 Accounts") and invest the account's value in a limited menu of mutual funds available. Conceptually, the UPromise™ service is equivalent to "rewards programs" or "cash-back programs" offered by credit card issuers except that value earned (cash equivalent) is credited to the UPromise™ 529 Account instead of as "points" to a reward program or "cash back" to the stored value or credit card account.

Accordingly, both the aforementioned savings account model and the UPromise™ 529 Account face major limitations: neither represents a prepaid card that may be used as a direct funding mechanism wherein the intended or targeted product at the time of purchase by the purchaser is a financial product. To the contrary, the product associated with these exemplary conventional cards at the time of purchase by the purchaser is itself a cash equivalent and not directly targeted or intended at the time of purchase to be applied to a financial product. This represents a significant distinction from a standpoint of complying with all federal and state statutory regulations.

As such, although the popularity and boom of prepaid cards has led to greater use and increased availability of products and services on a prepaid basis, to date such cards have never been offered wherein the intended or targeted funding at the time of purchase by a purchaser is to be applied to a financial product. There are multiple reasons for this, including:

1) Traditionally, gifting of regulated securities has been complex and confusing, and as a result, consumers and financial institutions have shied away from it;
2) Securities operate in highly regulated environments, and as a result, developing a processes for the purchase and gifting of such products in a way that complies with appropriate federal or state registration regulations is complex;
3) Financial service products have typically been sold through regulated financial institutions—not through more mainstream unregulated consumer channels in which pre-paid cards are commonly offered; and
4) Financial service and investment products in particular can be complex, and as a result, selling them through channels that do not provide a great deal of handholding requires a simplification of the process.

Indeed, federal and state regulated securities are usually targeted to upper-middle or high net worth individuals. As a result, the processes and methods traditionally used for selling these regulated securities have been limited in channel and reach. An unintended byproduct of this approach has been that a significant number of potential customers have often been excluded from participation, or their participation has been more limited than it otherwise might have been. For example, one substantial segment of the population generally not targeted is the "underbanked" population, which is estimated to include approximately 40 million households in the United States. Underbanked individuals either do not have regular bank accounts or rely heavily on non-traditional financial channels such as check cashing stores, payday loan retail outlets, or financial products at supermarkets, drugstores or similar channels. Because regulated securities and insurance most often have been sold through authorized sales agents that need to be registered or licensed either at the federal or state level (e.g., bank channels, broker-dealers, or financial planners), customers such as the underbanked who for various reasons do not feel comfortable using these channels are left out. Therefore, adoption of such regulated securities by these potential customers remains low. A system and method for the sale of prepaid cards through an unregulated entity (i.e., a sales agent that need not be registered or licensed as would a broker or agent in a conventional financial institution) wherein the prepaid card is intended or targeted at the time of purchase by the purchaser to fund a financial product is desirable in order to expand access to such products by this customer segment.

Beyond the underbanked segment of the population, most individuals in the United States participate in mutual funds via 401(k) plans offered through employers but participation by them outside of these plans remains more limited.

At the same time, heretofore mainstream and underbanked consumers of relatively modest financial means have often been ignored by traditional financial institutions, especially when it comes to regulated securities and insurance, on the basis that such consumers are simply unprofitable clientele given the traditional cost structure of providing such financial products.

It is therefore desirable to develop a method and system for the funding of a financial product as the intended or targeted product at the time of purchase by the purchaser via prepaid cards that addresses these key challenges while complying with all statutory regulations.

SUMMARY OF THE INVENTION

An aspect of the present invention is directed to a system and method for providing access to financial products by customers that otherwise may not be targeted via traditional financial channels while complying with federal and state statutory regulations thereby supporting lower investment account balances with a lower cost structure. Prepaid cards intended or targeted by the purchaser at the time of purchase for a financial product have the potential to address both these problems because they (a) provide an easy mechanism for transaction and (b) are sold in non-traditional channels that provide access for a wide customer base.

Another aspect of the invention relates to a method and system for funding financial products via prepaid cards that seeks to solve the aforementioned challenges. In so doing, a purchaser may purchase and therefore pre-pay for cards intended or targeted at the time of purchase by the purchaser to be applied to financial products. These prepaid cards may either be purchased for oneself or transferred to another individual or entity.

Still another aspect of the present invention is to provide a system and method for funding financial products via prepaid cards that allows for the effective gifting of value to help facilitate the purchase of such products.

Yet another aspect of the present invention is to provide a system and method for funding financial products via prepaid cards in a stock keeping unit (SKU) which are available to potential customers in a retail store environment without requiring the sales agent, issuer, sponsor or retailer to become a regulated entity based on the fact that it is intended to be applied to a financial product as otherwise would be required of a broker or agent in a conventional financial institution.

One more aspect of the present invention is to provide a system and method for funding financial products via prepaid cards through mainstream channels outside of traditional financial institutions, including the aforementioned non-regulated retail channels not required to be registered or licensed.

Another aspect of the present invention is to provide a system and method for funding financial products via prepaid cards to increase participation among key segments of the consumer population that otherwise lack access such as the underbanked that have heretofore been largely ignored by traditional brokers and financial institutions.

All this is desired while providing a system and method for funding financial products via prepaid cards that remains profitable and sustainable for the retailer, product sponsor, sales agent or issuer while complying with all statutory regulations.

Further objects and advantages will become apparent from a consideration of the ensuing description and drawings.

The present invention is directed to a system and method for funding via a prepaid card a financial product intended at a time of purchase by a purchaser and conveyed to a customer. A customer cash account is created and funds allocated to the prepaid card are redeemed solely as cash funds in the customer's cash account. The customer may either withdraw at least some of the cash funds in the customer's cash account or apply at least some of the cash funds in the customer's cash account to a financial product. In response to receiving the customer's instructions to apply the cash funds from the customer's cash account to a financial product selected by the customer as well as their acknowledgement of disclosures or consent to an agreement related to the selected financial product, the at least some of the cash funds are applied to an associated financial product account.

In yet another aspect of the present invention is directed to a system for funding via a prepaid card a financial product intended at a time of purchase by a purchaser. The system includes a processor and a memory operatively connected to the processor. Stored in the memory are a plurality of modules including: a cash account module configured to perform functionality for creating or accessing a customer cash account after receiving from a customer personal information; a cash redemption module configured to perform functionality to redeem cash allotted to the prepaid card solely as cash credited to the customer's cash account; a cash withdraw module configured to withdraw at least some of the cash funds credited to the customer's cash account; a financial product funding module configured to apply at least some of the cash funds from the customer's cash account to a financial product in response to receiving an affirmative action from the customer; a financial product display module configured to generate and display a list of financial products available for selection by the customer; a financial product customer selection module configured to receive and process the customer's selection of one or more financial products from the list of available financial products; a customer acknowledgement module configured to receive affirmation acknowledgment from the customer of receipt of a prospectus, disclosure and/or acceptance of terms/conditions related to the selected financial product; a financial product account module configured to apply at least some of the cash funds from the customer's cash account to a financial product account in the selected financial product; and a communication interface module configured to receive and transmit data.

Still another aspect of the present invention is directed to a computer-readable medium comprising computer-readable code executable on a computer, the computer-readable code comprising instructions for: (a) establishing a customer cash account for a customer having a prepaid card intended at the time of purchase by a purchaser for funding a financial product; (b) redeeming funds allocated to the prepaid card solely as cash funds in the customer's cash account; (c) providing the customer with an option to either withdraw at least some of the cash funds in the customer's cash account or apply at least some of the cash funds in the customer's cash account to a financial product to be selected by the customer; (d) applying the at least some of the cash funds in the customer's cash account to the financial product to be selected by the customer; (e) displaying of financial products available for selection by the customer; (f) receiving the customer's selection of a financial product; (g) receiving from the customer at least one of: (i) acknowledgment of receipt of a prospectus and/or other disclosure related to the selected financial product, and (ii) consent to terms of an agreement associated with the selected financial product; and (h) applying the at least some of the cash funds from the customer's cash account to the selected financial product to an associated financial product account.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views.

DETAILED DESCRIPTION OF THE PRESENTLY PREFERRED EMBODIMENTS OF THE INVENTION

The present invention system and method is for the funding via prepaid cards (e.g., gift cards or stored value cards) of a financial product (e.g., regulated securities and insurance) as an intended or targeted product by the purchaser at the time of purchase from non-regulated entities (e.g., entities that are not required to be registered or licensed as would otherwise be required of brokers and agents at conventional financial institutions). Cards in accordance with the present inventive method and system differ from those heretofore available in that at the time of purchase by the purchaser the targeted and intended principle use of the card is for funding of a financial product rather than for a cash equivalent while still complying with statutory guidelines (e.g. in the case of a regulated security, complying with registration guidelines for the sale of securities by registered or licensed sales agents only).

Figure 1:
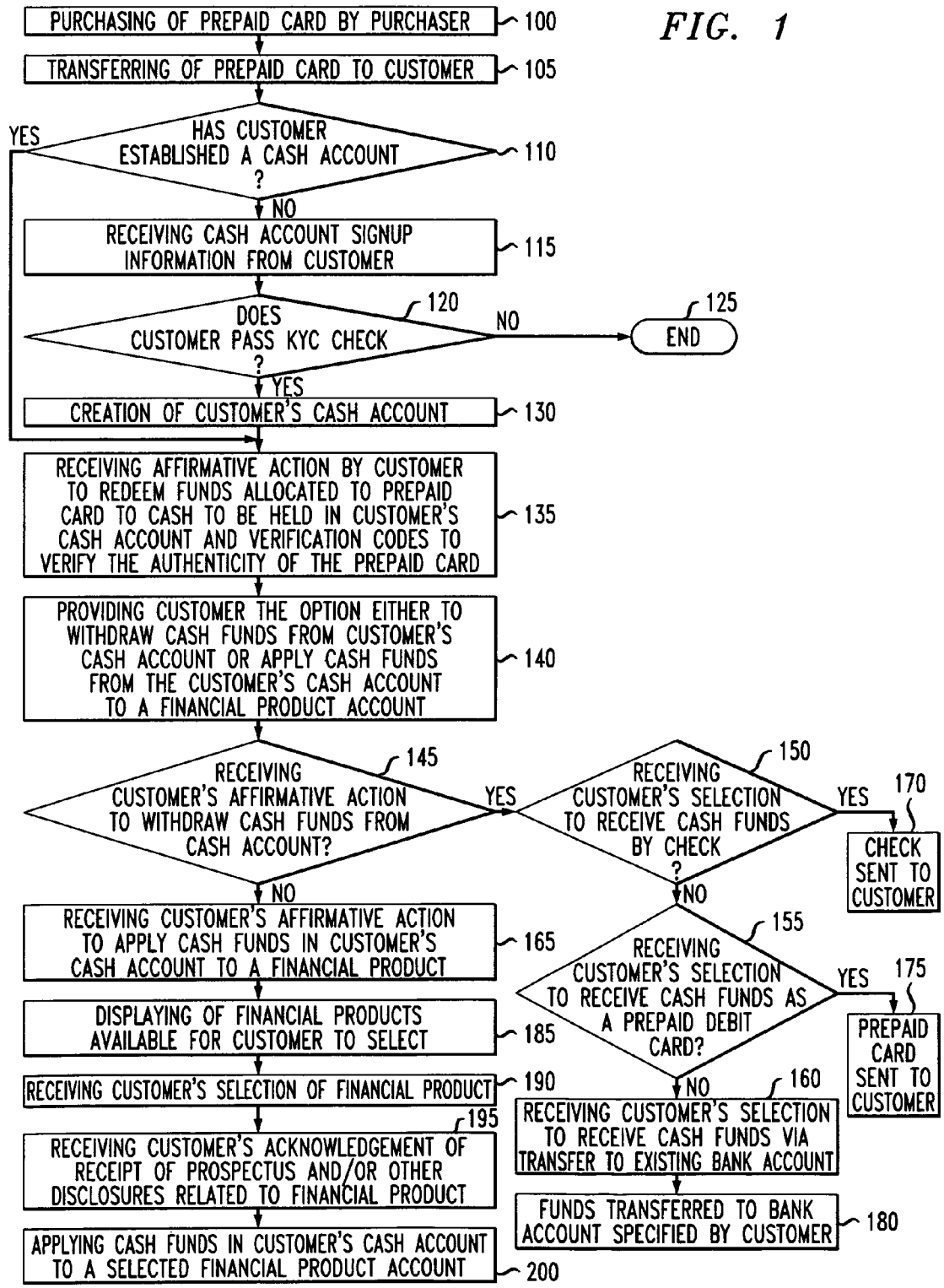
FIG. 1 is an exemplary flow diagram of the overall method for using the system in accordance with the present invention for funding via a prepaid card a financial product as an intended or targeted product by the purchaser at the time of purchase in accordance with the present invention.

FIG. 1 is an exemplary flow chart of the overall process for funding financial products as an intended or targeted product by the purchaser at the time of purchase via a prepaid card. Initially, in step 100 a purchaser buys or purchases a prepaid card specifically targeted or intended at the time of purchase by the purchaser to fund a financial product. Prepaid cards may come in any desired form, for instance, gift cards, stored value cards, or any other type of pre-payment card. A particular type of card is selected by the customer from those being offered for sale by the particular sales agent, issuer, retailer or sponsor. Predetermined denominations such as $25, $50, $100, or any other fixed or open denomination card values are preferably offered for sale to be chosen, as desired, by the purchaser. Such predetermined denominations may be offered as desired by the sales agent, issuer, retailer or sponsor but preferably more than one denomination is available. The denomination of the card is selected and paid for by the purchaser at the time of the purchase. In step 100, a purchaser purchases the prepaid card using cash, credit card, debit card, money order, check or any other monetary instrument. Purchase of the prepaid card by the purchaser may be made at a physical retail store location, electronically (e.g., on line by accessing a website or by telephone), by mail, or any other recognized distribution channel. Due to the inventive system and method in accordance with the present invention, the entity offering for sale the prepaid card intended or targeted, for a financial product at the time of purchase by the purchaser does not have to be a registered or licensed sales agent for securities or insurance products, as otherwise would be required for the sale of such financial products by brokers and agents at conventional financial institutions. No personal information is required of the purchaser when purchasing a prepaid card for funding of an intended or targeted financial product at the time of purchase by the purchaser. Nor is the purchaser required to provide any information concerning the customer of the prepaid card. A purchaser has the option of keeping the card for himself/herself or transferring it to someone else who will hereinafter be referred to as the customer, as represented in step 105. In the former case, the purchaser and customer are the same individual or entity, whereas in the latter case the customer is a different individual or entity (e.g., churches or other non-profit organizations) to whom the card has been gifted, exchanged, transferred. Like any gift card, the individual or entity in possession of the prepaid card in accordance with the present invention is the customer. In step

105 the prepaid card is transferred to the customer. If the purchaser retains the prepaid card themselves, then step 105 is eliminated.

Funds allotted to the prepaid card are redeemed as cash and applied to a customer's cash account before being withdrawn as a cash equivalent or applied to a financial product of choice. Accordingly, a display is generated by the system in block 110 inquiring whether the customer has already established, opened or created a cash account. If the user has already established a cash account then the process advances to step 135 wherein the system awaits the customer's affirmative action to redeem the funds allotted to the prepaid card solely as cash by crediting the funds to the customer's cash account. Otherwise, in step 115 the system generates one or more display screens guiding the customer through the process required to establish or create a customer cash account. Account signup/login is preferably established electronically (e.g., via telephone or online), but may be conducted by any other means such as via mail. The customer is prompted to enter account signup information, for example, name, e-mail address, address, date of birth, address, telephone number, social security number and/or driver's license or any other identification information concerning the customer. In addition to such preliminary information, preferably the customer is prompted to create an account password to safeguard against future unauthorized access to information concerning the cash account. At some time during the present inventive method, the system executes customer authentication processing (e.g., Know Your Customer (KYC) check, and/or Customer Identification Program (CIP)) to verify the customer's identity and ensure he/she satisfies certain preconditions (e.g., over the age of 18, is not on the United States Department of the Treasury Office of Foreign Assets Control (OFAC) list, etc.) as mandated by statute such as the Bank Secrecy Act, Patriot Act and other statutory regulations. FIG. 1 depicts the performance of a KYC check in step 120, however, any other type of customer authentication processing to verify the customer's identify may be employed in addition to or instead of the KYC check or CIP, as desired, and the step may be performed at any time prior to the establishment of a financial product account (as described in detail further). There are many ways to authenticate the customer's identity such as, but not limited to, via their social security number, name and address, driver's license and/or credit history. If the customer does not pass the KYC check, he/she is precluded from opening, creating or establishing a customer cash account in step 125. Once the customer passes the KYC check, a customer cash account in their name is created in step 130.

The next operation in the present inventive method is for the system to generate a display screen prompting the customer whether they wish to redeem funds allocated to the prepaid card solely as cash to be credited to or held in the customer's cash account. In step 135 the system awaits receipt of the customer's affirmative action to redeem funds allocated to the prepaid value card as cash to be held in the their cash account and verification codes to verify the authenticity of the prepaid card. Alternatively, rather than awaiting the customer's affirmative action, the redemption of funds allocated to the prepaid card solely as cash to be credited to or held in the customer's cash account may occur in response to an affirmative action on the part of the purchaser or automatically by the system based on some triggering event (e.g., funds less than a predetermined minimum threshold). Due to the fact that the intended or targeted financial product at the time of purchase of the prepaid card by the purchaser is a financial product, the funds allotted to any prepaid card are initially redeemed solely for cash and held in or credited to the customer's cash account prior to the customer being given the option to apply the cash funds to a financial product. Accordingly, once the system receives the customer's affirmative action to redeem the funds allocated to the prepaid card as cash to be held in their customer cash account, the system generates a prepaid card verification display screen prompting the customer to enter or provide one or more prepaid card verification codes to verify the authenticity of the prepaid card such as an authorization number and/or PIN number preferably identified on the prepaid card itself. In the example shown in FIG. 1 such prepaid card verification processing to verify the authenticity of the card is performed after customer authentication processing, however the order may be switched whereby prepaid card verification processing is performed prior to customer authentication processing. The prepaid card verification codes may be entered by the customer using a keyboard or electronically scanned from the card itself such as by using a reader, for example, a bar code scanner or magnetic reader. Alternatively, not all of the prepaid card verification codes may be printed on the prepaid card itself. By way of example, the prepaid card may be embossed with a unique identification code which has to be entered after signing onto a website or provided to a service center to acquire from it the corresponding authorization code and/or PIN number. After receiving from the customer their affirmative action to redeem the funds allocated to the prepaid card as cash and verifying the authenticity of the prepaid card, the allocated funds are then credited solely as cash in the customer's cash account. It should be noted that step 135 may be modified so that instead of awaiting receipt of a particular affirmative action by the customer to redeem funds allocated to the prepaid card to cash to be held in the customer's cash account, the system may be designed to automatically trigger redemption of the funds allocated to the prepaid card to cash to be held in the customer's cash account merely upon verifying the prepaid card verification codes without requiring a separate affirmative action by the customer.

The system in step 140 automatically generates a screen prompting the customer with the option of either withdrawing the cash funds in the customer's cash account or applying the cash funds to a financial product via an associated financial product account. If the system receives the customer's affirmative action to withdraw cash funds from the customer's cash account (step 145), he/she is presented with one or more cash equivalent withdraw options. As an alternative to awaiting the customer's affirmative action each time cash funds are requested to be withdrawn from the customer's cash account, such system functionality may be automatically triggered by the system perhaps triggered by some event. For example, the customer may instruct that the cash funds be automatically withdrawn from the customer's cash account on a continuing basis every predetermined time period (e.g., monthly, quarterly, semi-annually or annually) without awaiting periodic receipt of an affirmative action on the part of the customer. As yet another example, the cash funds may be automatically withdrawn from the customer's cash account upon the funds reaching a predetermined amount (e.g., $100 or $1,000).

If the customer has opted to withdraw the cash funds from the customer's cash account, several cash equivalent withdraw options are preferably offered. One option presented in step 150 is for the customer to withdrawal the funds via check. In so doing, a check is issued and sent to the customer in step 170 at his/her address on record as provided by the customer when the customer's cash account was created. Another option presented to the customer in step 155, the allocated funds redeemed to the customer's cash account may be withdrawn as a pre-paid debit card. Here also, the pre-paid debit card is sent to the customer at their address on record in step 175. The last option shown in the exemplary flow chart in step 160 is to withdrawal the credited funds from the customer's cash account to an existing bank account of their choice via an Automatic Clearing House (ACH), Bank Wire Transfer (BWT) or any other Electronic Funds Transfer (EFT) mechanism. If this last option is chosen, the customer is prompted to enter the bank account information such as the account number and routing number to which the funds from their customer cash account are to be transferred or else if the customer has previously provided the bank information it may be defaulted to the previous selection. Once the information has been provided by the customer, the cash funds are transmitted, transferred or routed to their specified bank account in step 180. Other methods for withdrawal of the cash funds from the customer's cash account are contemplated and within the intended scope of the present invention. The customer is presented with the choice of withdrawing all or a portion of the credited cash funds in the customer's account may be withdrawn as a cash equivalent in lieu of applying those funds to a financial product to be selected by the customer.

As an alternative to the withdraw the cash funds from the customer's cash account, the system in step 165 awaits receipt of an affirmative action or selection by the customer to apply the cash funds from the customer's cash account to a financial product to be selected by the customer. In response to the system receiving the customer's affirmative action or selection to apply the cash funds in their customer cash account to a financial product, in step 185, on a separate screen the system displays a list of available financial products from which the customer may choose. The present invention is not restricted in scope only to financial products and therefore contemplates products other than financial products may be included on the list, as desired.

The customer's selection of one or more financial products from the list of available financial products is received by the system in step 190. Thereafter, in step 195 the system awaits from the customer affirmative action acknowledging receipt of the prospectus and/or other disclosures related to the selected financial product prior to applying the cash funds from the customer's cash account. Preferably, such prospectus and/or other disclosure will be electronically delivered to the customer (e.g., via e-mail) or accessible by the customer by logging in to a predetermined website. In order for the cash funds from the customer's cash account to be applied to the selected financial product and a corresponding financial account to be opened, the system awaits receipt from the customer some affirmative action such as making an affirmative selection on the screen acknowledging receipt of and/or review of the prospectus and/or other disclosure(s) related to the selected financial product. If such affirmative action is not received by the system from the customer, the cash funds from the customer's cash account will not be applied to the purchase of the selected financial product. The example illustrated in FIG. 1 has been limited to receiving affirmative acknowledgement from the customer of the prospectus and/or disclosure. When applicable, the affirmative action in step 195 may also or instead include acceptance of any terms and conditions such as in an agreement prior to applying the cash funds form the customer's cash account to the selected financial product. It should be noted that the affirmative action by the customer in step 195 is only required once when the financial product account is initially created, such affirmative action is thereafter not required if the customer opts to apply additional cash funds from their customer cash account to the existing or established financial product for which a financial product account already exists. Along these lines, the customer may affirmatively choose for the cash funds to be automatically applied on a periodic or ongoing basis to a previously established financial product account.

Lastly, in step 200 having received the customer's affirmative action acknowledging receipt of the prospectus and/or disclosures related to the selected financial product, the statutory regulation requirements associated with the financial product having therefore been satisfied, the cash funds from the customer's cash account are applied to purchase the selected financial product by establishing a counterpart financial product account for that selected financial product. It should be noted that a financial product account was previously created for the particular selected financial product and thus already exists, then the cash funds are may be applied to the existing financial product account for that same financial product.

It is to be noted, that the present inventive system may be modified so that in steps 185 and 190 the recipient is provided a list of available products including both financial products and products other than financial products. In such a situation, the same steps thereafter would be performed for those other products as described above for the financial products with the only possible exception of the type of disclosure to be reviewed for each. For example, if the financial product is a regulated security the customer may be required to acknowledge receipt of a prospectus related to the selected financial product as well as other possible disclosures, whereas if the financial product is a savings account acknowledgement of receipt of a savings agreement by the customer may be required.

The prepaid card that enables funding of an intended or targeted financial product by the purchaser at the time of purchase in accordance with the present invention may be sold in a retail environment in a stock keeping unit (SKU). The Product SKU may include a card product, certain disclosures and instructions, and optionally a customer guide or other startup kit elements such as CDs and DVDs. The SKU will clearly advertise itself as associated with the financial product. The card product may be a "temporary card" which may later be substituted with a plastic card (the "Permanent Card") that, if desired, may be embossed with the cardholder's name.

The SKU may be packaged in various ways, such as a cardboard "card carrier" suitable for hanging on a J-hook or in a "box" or "pack" which the customer would open. The packaging for the SKU may be designed, as desired, according to various factors such as the distribution channel or retail environment. Both the plastic card and SKU may be branded to improve or enhance marketing of the financial product to consumers. For instance, efforts may focus on branding or linking the financial product to existing financial firms, financial "personalities," corporations, retail brands and/or celebrities.

In a preferred embodiment, the SKU may be marketed as a prepaid funding mechanism for financial products appropriate for gifting on certain "life occasions" or which meet the financial goals/objectives of targeted customers. The SKU's packaging may be designed accordingly and marketed under programs structured to reach consumers undergoing the described life occasions or with the described financial goals/objectives. Examples of life occasions include weddings, childbirths, birthdays and graduations while financial goals/objectives may include saving for a home, education, retirement and a child. The present inventive card may be marketed to any other life occasions and financial goals/objections than those expressly mentioned above.

In a preferred embodiment, the present inventive prepaid card enables customers to fund financial products based on their specific needs. The prepaid card structure has the advantage, of allowing the sales agent, producer, sponsor, retailer or issuer of the financial product to match the marketing vehicle with the customer's needs and goals.

The SKU may contain (1) various descriptions of the financial products which may be funded by the funds deposited into the card account, (2) brief explanations of how the process of using the card works, and optionally (3) notices about the value of saving and investing for the future. Whenever required or deemed appropriate the SKU products contain certain disclosures to ensure that the customer does not perceive the intended or targeted financial products associated with the card account to be guaranteed or insured. An example of language to this effect is: "Investment products are NOT FDIC INSURED, NOT BANK GUARANTEED, AND MAY LOSE VALUE."

The system may also include functionality to provide an interactive information tool to the customer cash account holder so that the accountholder may be presented with several financial product options after submitting his/her financial goals and other information to an interactive information tool. The interactive information tool may also suggest which type of financial product (e.g., particular type of regulated security (e.g., mutual fund, bond, or treasury stock) or insurance (e.g., variable annuity)) the customer cash account holder may wish to choose based on the information the account holder has entered.

As the financial product will be available in retail locations, a "referral compensation" process may be used as a method to share revenue from the sale of the financial product with such sales agents, retailers, issuers or sponsors. The financial product will allow various means for customers to communicate with the institution administering the financial product, and will allow customers to change financial products should the customer's desires change.

Figure 2:
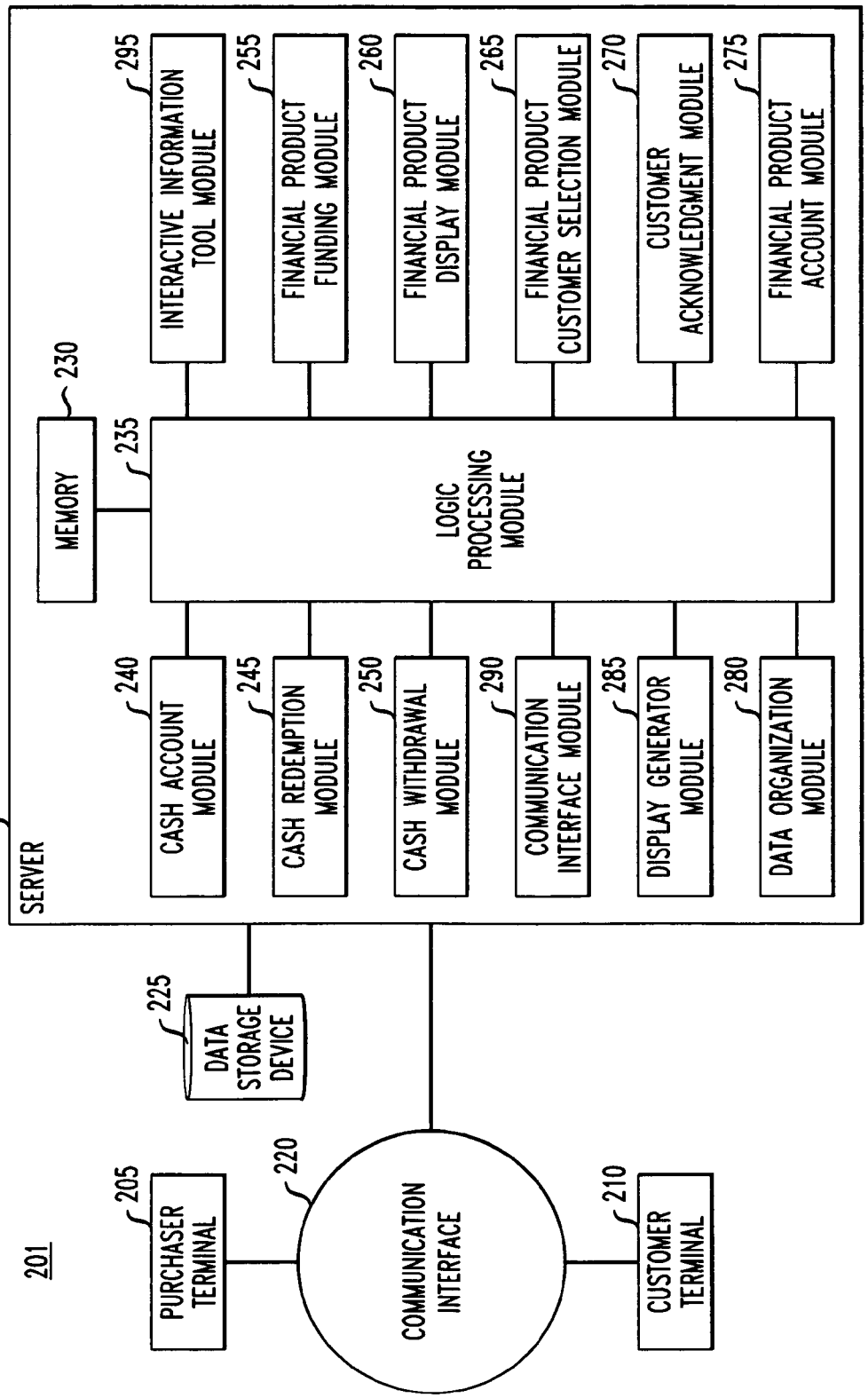
FIG. 2 is an exemplary high level schematic view of the system for funding via a prepaid card a financial product as an intended or targeted product by the purchaser at the time of purchase in accordance with the present invention.

FIG. 2 is an exemplary high level schematic diagram of the present inventive system 201 for carrying out the method for funding a financial product intended or targeted at the time of purchase by a purchaser via a prepaid card, as described above. The system 201 includes at least one purchaser terminal 205 and at least one customer terminal 210. By way of example only, one of each terminal is shown, however, more than one of each terminal will most likely be used. All terminals may be a computer, personal digital assistance (PDA), landline telephone, mobile telephone or any other processing device regardless of whether it is portable or not. Despite being shown as two separate terminals, the same terminal may be shared or used by the purchaser and customer. Purchaser terminal 205 may be located at a point of sale retail store or otherwise may be a computer or other processing device accessible by the purchaser such as a personal computer via which the prepaid card is purchased by visiting a website. All terminals are in communication with a server 215 via a communication interface 220 such as the Internet, intranet, world wide web, Local Area Network (LAN), Wide Area Network (WAN), Ethernet, or any other communication interface. Only a single server 215 is shown in FIG. 1, however, more than one sever may be utilized, as desired. Server 215 is operatively connected to a data storage device 225 for the storage of data including, but not limited to, the cash account data associated with the customer cash accounts, personal information provided by the customer in creating the customer cash account and financial product account data associated with the financial product(s) selected by the customers. Data storage device 225 is external to server 215 in FIG. 2 but may be internal thereto or comprise more than one storage device. In addition, server 215 includes an associated memory 230 for storing all software programming required such as that for communication and processing of all functionality associated with the server. Such software programming includes that necessary to execute the different modules associated with the sever 215 as well as programming for bidirectional communication of the server with all of the terminals. Each terminal also has a processor and associated memory on which software programming is stored and when executed by the processor enables communication with the server and all functionality for that terminal to execute the operations in accordance with the present inventive system.

Server 215 includes a plurality of software and/or hardware modules stored in memory 230. The modules include: a logic processing module 235 configured to perform logic processing associated with the server not otherwise specifically mentioned by another module; a customer cash account module 240 configured to perform all functionality for either creating a new or accessing an existing customer cash account after receiving customer personal information and preferably including customer verification processing; a cash redemption module 245 configured to perform all functionality to redeem cash applied to the prepaid card solely as cash credited to the customer's cash account; a cash withdrawal module 250 configured to withdraw at least some of the cash funds credited to the customer's cash account; a financial product funding module 255 configured to apply at least some of the cash funds from the customer's cash account to a financial product in response to receiving an affirmative action from the customer; a financial product display module 260 for generating and displaying a list or menu of financial products available for selection by the customer; a financial product customer selection module 265 for receiving and processing the customer's selection of one or more financial products from the list of available financial products; a customer acknowledgment module 270 for receiving affirmation acknowledgment from the customer of receipt of a prospectus, disclosure and/or acceptance of terms/conditions related to the selected financial product; a financial product account module 275 for applying at least some of the cash funds from the customer's cash account to a financial product account for the selected financial product, if one does not already exist; a data organization module 280 for receiving, transmitting and processing of all data; a display generator module 285 for generating and displaying of the visual screens; a communication interface module 290 for receiving and transmitting data between the server 215 and terminals 205, 210; and an interactive information tool module 295 for providing the customer with suggested types of financial products based on received financial goals and/or other information provided by the customer. Additional modules may be employed to suit the particular functionality of the system. All such modules represent an electronic hardware and/or software component that interacts with the larger processing system.

In operation, the prepaid card may be purchased by a purchaser at a physical point of sale retail location, by mail, or electronically such as online by visiting a website using a purchaser terminal 205. By way of example, the present invention will be described in the case of the purchase of the prepaid card by the purchaser electronically on line by visiting a predetermined website. Preferably a selection of prepaid card in assorted predetermined denominations for funding an intended or targeted financial product by the purchaser at the time of purchase are available to the purchaser at the website.

The purchaser selects the particular denomination of choice and makes the purchase electronically (e.g., credit card or Pay Pal) or any other payment method. A prepaid card in the chosen denomination is then sent to the purchaser who, in turn, may transfer the card to a customer or retain the card for himself/herself. Alternatively the prepaid card may be sent (e.g., electronically, via mail or other means) directly to the customer thereby bypassing the purchaser.

The customer of the prepaid card visits a predetermined website using the customer terminal 210. This website may be the same or different from that visited by the purchaser to initially buy the prepaid card. For the purposes of this example, the same website is used by the purchaser and customer. Operation of the website is controlled by the server 215. Upon visiting the website the display generation module 285 is accessed by the server 215 to generate a display inquiring whether the customer has established a cash account. If not, then the server 215 executes the customer cash account module 240 to open a new customer cash account or open an existing customer cash account. The display generation module 285 generates display screens prompting the customer to provide sign up information and the communication interface module 290 receives the information provided by the customer via the customer terminal 210 transmitted over the communication interface 220 to the server 215. Part of the functionality performed by the customer cash account module 240 preferably includes customer verification processing (e.g., KYC check or CIP program) of the information prior to establishing a new customer cash account. The opening of the customer cash account is performed by the customer cash account module 240. If a customer cash account has already been established, then the login, user and/or password information provided by the customer via the customer terminal 210 is verified by the customer cash account module 240 prior to providing access to such account information.

Cash redemption module 245 awaits receipt of an affirmative action from the customer terminal 210 requesting the funds allocated to the prepaid card to be redeemed and held in the customer's cash account. After the funds allocated to the prepaid card have been credited to the customer's cash account, the display generator module 285 generates a display providing the customer with the two options: (i) withdrawing at least some of the cash funds in the customer's cash account; (ii) applying at least some of the cash funds in the customer's cash account to a financial product. It should be noted that the total value of the cash funds in the customer's cash account need not be applied to either one or the other option. Instead, the value of the cash funds in the customer's cash account may be divided or distributed, as desired, between these two options. That is, by way of example, 50% of the cash funds in the customer's cash account may be withdrawn, while the remaining 50% of the cash funds in the customer's cash account may be applied to a financial product selected by the customer.

The customer's affirmative action to withdraw at least some of the cash funds in the customer's cash account is received and processed by cash withdraw module 250. In turn, cash withdraw module 250 together with display generator module 285 will generate the display screens offering to the customer different cash equivalent withdraw options such as check, pre-paid debit card or transferring of the cash funds to an existing bank account.

Alternatively, if the server 215 receives an affirmative action from the customer via the customer terminal 210 to apply at least some of the cash funds to the customer's cash account this information is processed by the financial product funding module 255. Thereafter, the financial product display module 260 in combination with the display generator module 285 are enabled to display a screen of financial products available for selection by the customer. Financial product customer selection module 265 receives the customer's selection of one or more selected financial products from the list of available financial products. Next, the customer acknowledgement module 270 sends the customer prospectus and/or other disclosure related to the selected financial product to the customer and, in turn, awaits receipt of affirmative acknowledgment of such materials from the customer and/or consent to any agreement (if applicable). A financial product account module 275 then applies at least some of the cash funds to the selected financial product and opens a financial product account for that selected financial product. Organization of data received or processed by the server 215 is processed by the data organization module 280. As previously mentioned above, server 215 may generate suggested financial product types based on financial goals and other information received from the customer. Such processing to generate suggested financial product types in response to a customer's affirmative action is performed by the interactive information tool module 295.

An exemplary system is shown in FIG. 2 and described herein for illustration purposes only. It is contemplated and within the intended scope of the present invention to design the system whereby neither the cash redemption module 245 nor the cash withdraw module 250 require receipt of an affirmative action on the part of the customer to begin processing but instead may be automatically triggered by the server 215 based on some other triggering event or triggered in response to receiving an affirmative action on the part of the purchaser.

The present inventive system and method for funding via a prepaid card a financial product intended or targeted by the purchaser at the time of purchase complies with all federal and state regulations while expanding the potential customer base for such financial products. Moreover, the prepaid card in accordance with the present inventive system and method may be offered, sold and issued by entities that are not required to be registered or licensed for selling a financial product when otherwise such would be required of brokers and agents of conventional financial institutions.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A method for funding via a prepaid card a financial product intended at a time of purchase by a purchaser and conveyed to a customer, the method comprising the steps of:
    (a) establishing a customer cash account in response to information provided by the customer;

(b) redeeming funds allocated to the prepaid card solely as cash funds in the customer's cash account;

(c) providing the customer with an option to either withdraw at least some of the cash funds in the customer's cash account or apply at least some of the cash funds in the customer's cash account to a financial product to be selected by the customer;

(d) applying the at least some of the cash funds in the customer's cash account to the financial product to be selected by the customer;

(e) displaying of financial products available for selection by the customer;

(f) receiving the customer's selection of a financial product;

(g) receiving from the customer at least one of: (i) acknowledgment of receipt of a prospectus and/or other disclosure related to the selected financial product, and (ii) consent to terms of an agreement associated with the selected financial product; and (h) applying the at least some of the cash funds from the customer's cash account to the selected financial product by an associated financial product account.

2. The method in accordance with claim 1, wherein the financial product is one of: (i) insurance, or (ii) a federal or state regulated security.

3. The method in accordance with claim 1, wherein the customer and the purchaser are the same or different individuals or entities.

4. The method in accordance with claim 1, wherein the step (b) of redeeming funds is triggered either: (i) in response to receiving an affirmative action by the customer or the purchaser, or (ii) automatically based on some triggering event without requiring the affirmative action by the customer.

5. The method in accordance with claim 4, wherein the triggering event is at least one of expiration of a predetermined period of time or a predetermined value of the cash funds accumulated in the customer's cash account.

6. The method in accordance with claim 1, wherein the step (d) of withdrawing cash funds from the customer's cash account is triggered either: (i) in response to receiving an affirmative action by the customer, or (ii) automatically based on some triggering event without requiring the affirmative action by the customer.

7. The method in accordance with claim 6, wherein the triggering event is at least one of a expiration of a predetermined period of time or a predetermined value of the cash funds accumulated in the customer's cash account.

8. The method in accordance with claim 1, further comprising the step of providing a suggested financial product type to the customer in response to receiving financial goal and/or objective information from the customer.

9. The method in accordance with claim 1, wherein the prepaid card is offered by a non-registered or non-licensed entity otherwise required for a type of financial product selected by the customer.

10. The method in accordance with claim 1, wherein prior to step (a) performing the step of receiving payment from the purchaser for the prepaid card intended for the customer.

11. The method in accordance with claim 1, wherein in step (a) the information provided by the customer is at least one of customer authentication information and prepaid card verification codes.

12. A system for funding via a prepaid card a financial product intended at a time of purchase by a purchaser, the system comprising:
a processor;
a memory operatively connected to the processor and comprising:
   a cash account module configured to perform functionality for creating or accessing a customer cash account after receiving from a customer information;
   a cash redemption module configured to perform functionality to redeem cash applied to the prepaid card solely as cash funds credited to the customer's cash account;
   a cash withdraw module configured to withdraw at least some of the cash funds credited to the customer's cash account;
   a financial product funding module configured to apply at least some of the cash funds from the customer's cash account to a financial product in response to receiving an affirmative action from the customer;
   a financial product display module configured to generate and display a list of financial products available for selection by the customer;
   a financial product customer selection module configured to receive and process the customer's selection of one or more financial products from the list of available financial products;
   a customer acknowledgement module configured to receive affirmation acknowledgment from the customer of receipt of a prospectus, disclosure and/or acceptance of terms/conditions related to the selected financial product;
   a financial product account module configured to apply the at least some of the cash funds from the customer's cash account to a financial product account in the selected financial product; and
   a communication interface module configured to receive and transmit data.

13. The system in accordance with claim 12, wherein the memory further comprises an interactive information tool module configured to provide the customer with suggested types of financial products based on received financial goals and/or other information provided by the customer.

14. A non-transitory computer readable medium comprising computer-readable code executable on a computer, the computer-readable code comprising instructions for:

(a) establishing a customer cash account for a customer having a prepaid card intended at the time of purchase by a purchaser for funding a financial product, wherein the customer account is based on information received from the customer;

(b) redeeming funds allocated to the prepaid card solely as cash funds in the customer's cash account;

(c) providing the customer with an option to either withdraw at least some of the cash funds in the customer's cash account or apply at least some of the cash funds in the customer's cash account to a financial product to be selected by the customer;

(d) applying at least some of the cash funds in the customer's cash account to the financial product to be selected by the customer;

(e) displaying of financial products available for selection by the customer;

(f) receiving the customer's selection of a financial product;

(g) receiving from the customer at least one of: (i) acknowledgment of receipt of a prospectus and/or other disclosure related to the selected financial product, and (ii) consent to terms of an agreement associated with the selected financial product; and (h) applying the at least some of the cash funds from the customer's cash account to the selected financial product by an associated financial product account.

15. The computer readable medium in accordance with claim 14, wherein the financial product is one of: (i) insurance, or (ii) a federal or state regulated security.

16. The computer readable medium in accordance with claim 14, wherein the customer and the purchaser are the same or different individuals or entities.

17. The computer readable medium in accordance with claim 14, wherein the step (b) of redeeming funds is triggered either: (i) in response to receiving an affirmative action by the customer or the purchaser, or (ii) automatically based on some triggering event without requiring the affirmative action by the customer.

18. The computer readable medium in accordance with claim 14, wherein the step (d) of withdrawing cash funds from the customer's cash account is triggered either: (i) in response to receiving an affirmative action by the customer; or (ii) automatically based on some triggering event without requiring the affirmative action by the customer.

19. The computer readable medium in accordance with claim 14, further comprising the step of providing a suggested financial product type to the customer in response to receiving financial goal and/or objective information from the customer.

20. The computer readable medium in accordance with claim 17, wherein the triggering event is at least one of expiration of a predetermined period of time or a predetermined value of the cash funds accumulated in the customer's cash account.

21. The computer readable medium in accordance with claim 18, wherein the triggering event is at least one of a expiration of a predetermined period of time or a predetermined value of the cash funds accumulated in the customer's cash account.

22. The computer readable medium in accordance with claim 14, wherein the prepaid card is offered by a non-registered or non-licensed entity otherwise required for a type of financial product selected by the customer.

23. The computer readable medium in accordance with claim 14, wherein prior to step (a) performing the step of receiving payment from the purchaser for the prepaid card intended for the customer.

24. The computer readable medium in accordance with claim 14, wherein in step (a) the information provided by the customer is at least one of customer authentication information and prepaid card verification codes.

\* \* \* \* \*